Jan. 24, 1928. 1,657,046
J. C. W. STANLEY
APPARATUS FOR THE PRODUCTION OF FIBER FROM FLAX AND HEMP STRAW AND THE
LEAVES OF PHORMIUM TENAX SISAL ABACCA YUCCA AND THE LIKE
Filed April 18, 1927  2 Sheets-Sheet 1

Jan. 24, 1928. 1,657,046
J. C. W. STANLEY
APPARATUS FOR THE PRODUCTION OF FIBER FROM FLAX AND HEMP STRAW AND THE
LEAVES OF PHORMIUM TENAX SISAL ABACCA YUCCA AND THE LIKE
Filed April 18, 1927  2 Sheets-Sheet 2

J. C. W. Stanley
Inventor
D. L. Boyden.
Attorney

Patented Jan. 24, 1928.

1,657,046

UNITED STATES PATENT OFFICE.

JOHN CHARLES WILLIAM STANLEY, OF VICTORIA, BRITISH COLUMBIA, CANADA, ASSIGNOR TO OCEANIA INDUSTRIES LIMITED, OF VICTORIA, BRITISH COLUMBIA, CANADA.

APPARATUS FOR THE PRODUCTION OF FIBER FROM FLAX AND HEMP STRAW AND THE LEAVES OF PHORMIUM-TENAX SISAL ABACCA YUCCA AND THE LIKE.

Application filed April 18, 1927. Serial No. 184,693.

This invention relates to a combination of apparatus for retting flax and hemp straw for the purpose of dissolving the gum which holds the fiber and vegetable matter on the central woody core, the same process being known as de-gumming in the case of Phormium-tenax, sisal, abacca, and Yucca leaves which are lance shape varying in length from two to seven feet. The fiber is held together in a mass of vegetable gummy matter and it has been customary hitherto to employ mechanical means to scrape the vegetable matter from the fiber which is then washed by water spray.

The object of my invention is to provide apparatus for the continuous treatment of the fibrous leaves by suitable solvents, so as to obtain a soft fiber suitable for spinning into yarn for textiles, twine, and cordage, finally recovering the chemicals of value for future use.

Figure 1:
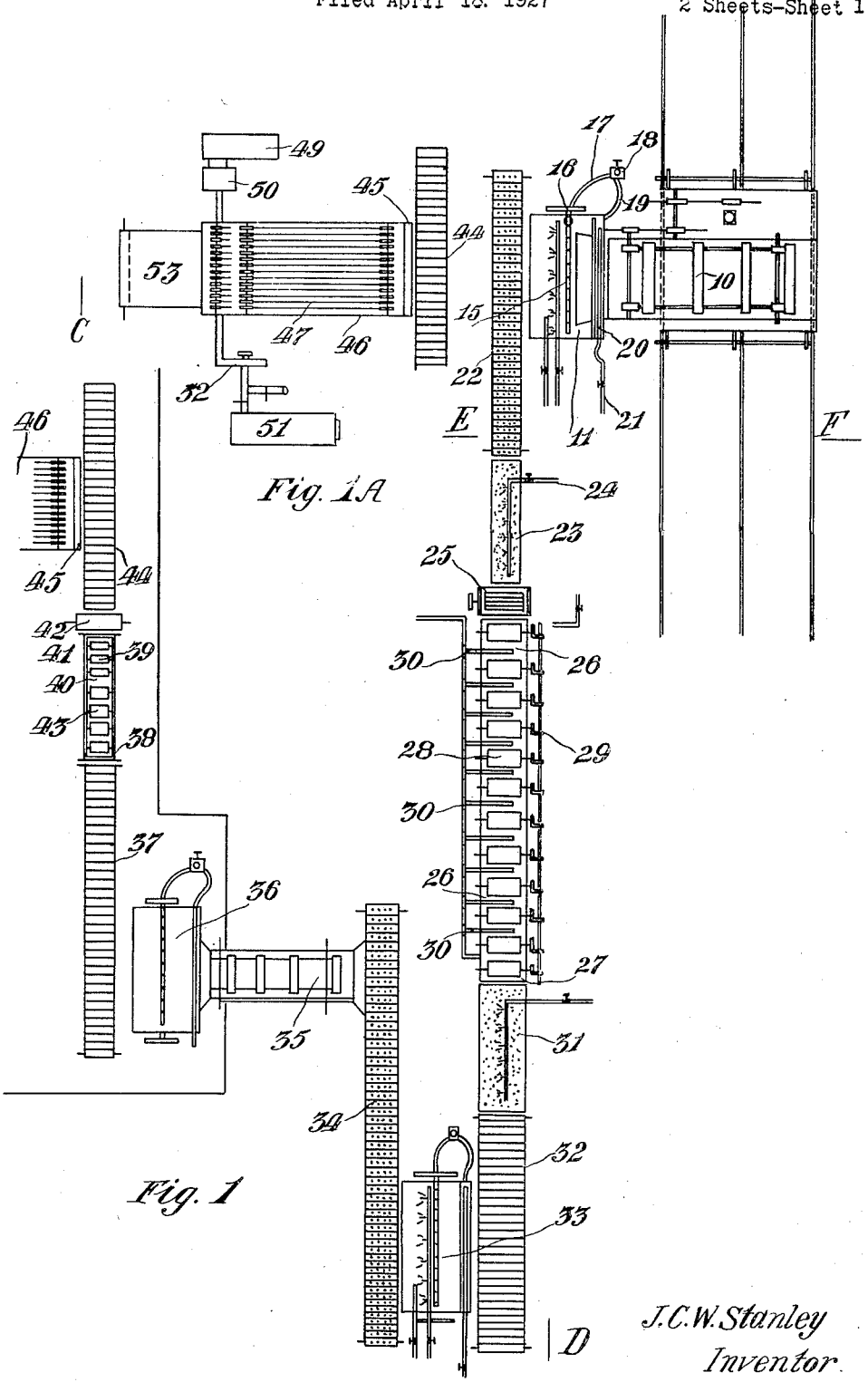
Figures 2, 3:
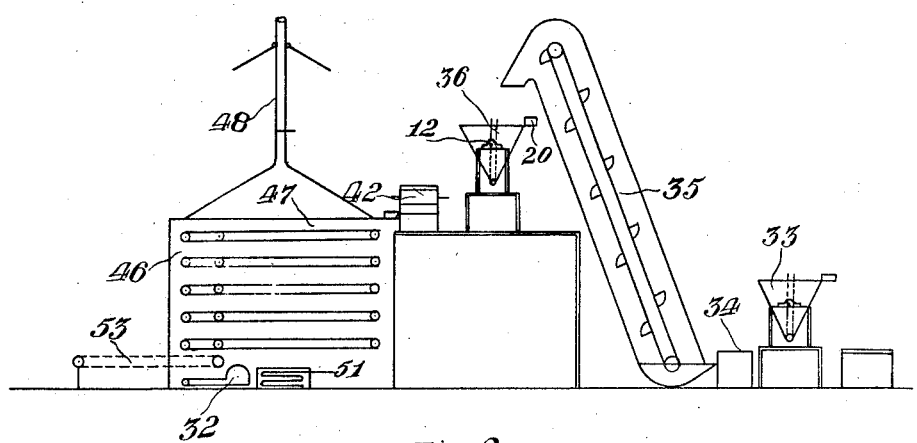

The invention is better described by reference to the drawings herewith which form part of this application, in which Fig. 1 is a general plan of the arrangement of the apparatus, the drawing for convenience being in two portions one being detached as shown in Fig. 1$^A$ which is a continuance of the Fig. 1. Fig. 2 is an end elevation of the left hand portion of the apparatus as shown in the plan viz, from C to D, and Fig. 3 is an end view of the right hand portion as viewed from E to D.

The sequential operation of the apparatus is as follows: The raw material and in the case of flax and hemp straw after the seed has been removed by thrashing or rippling, is placed in the buckets of the elevator 10, the buckets being in length sufficient to permit the straw to lie parallel—a point of importance which characterizes the entire apparatus—and discharged into the tank 11. This soaking tank 11 is preferably of triangular cross section, and is supported at its ends by trunnion bearings for the convenience of tipping or canting it marked 12. On the top side of the tank is a sliding cover 13 perforated along one side at 14 for the purpose of draining the contents when the tank is canted over, a perforated water pipe 50 is laid in the angular bottom at 15 this connects through the vertical pipe 16 with the flexible hose 17 to the rotary pump 18, the latter delivering through the flexible hose 19 to the narrow tank 20 which houses a range 55 of steam pipes 21, so that the water drawn from the bottom of the tank is raised to the required temperature during its circulatory passage through the tank and so retained until the retting or degumming process is 60 completed. The flexible connections 17 and 19 are employed to facilitate disconnection when the pipe 15 requires cleansing from the gummy material.

When a sufficiency of the raw material 65 has been loaded into the tank 11 it is filled up with water to which alkaline chemicals are added in suitable proportion varying with the character of the material. When the retting process has been completed as indicated by the softening of the gummy material and the loosening of the fiber from the central woody core, the tank is canted and the liquid drained from its contents and reserved for the recovery of the chemicals. 75 The fiber is then washed free from alkali by water spray and raked on to the apron slat type of conveyor 22 for further treatment. The slats on conveyor 22 are perforated and when the fiber has travelled a suitable distance it is delivered to the perforated shaking screen 23 where it is again washed by water spray from the device 24, thence passing into the rolls 25, these having a plain or slightly corrugated surface, the upper roller 85 having a spring attachment for adjusting the pressure. The rolls 25 deliver into the flume 26 in which water floats the fiber to the end at 27 where water and fiber overflow. On the flume 26 are attached a number of 90 separate paddles 28 each driven by external gearing 29. These paddles beat the fiber floating in the water and also carry it forward with the water. A perforated pipe 30 is arranged in the bottom of the flume and 95 is connected with a tank carrying compressed air at about 100 pounds pressure to the square inch. The ebulition of the air agitates the water in the flume and also sets up a degree of oxidation, both effects assisting the process in hand. The flume overflows on to a perforated shaking and draining screen 31 which discharges the fiber on to a slat type apron conveyor 32. The degummed and washed fiber on the conveyor 32 are raked into the tank 33 and there subjected to a bleaching process, this tank is similar in construction to the soaking tank 11. When the bleaching is completed the tank is drained and the fiber washed and then raked on to the slat type apron conveyor 34, and thence into the buckets of the elevator 35 from which it is discharged into another tank 36 which is also similar to the soaking tank 11. In this the fiber is soaked in an emulsion of fish oil, mineral oil, soap and water in suitable proportions varying according to circumstances. The object of soaking the fibers with this oleaginous emulsion is to soften it and return to the fiber the character of the natural oil and the original suppleness of quality which was removed by the soak in alkaline chemicals. When the soak is completed the tank 36 is canted and drained, and its contents raked on to a slat type conveyor 37 which discharges the fiber on to the shaking screen 38 from which it is delivered to the horizontal rolls 39. These rolls are of somewhat special construction; between the upper and lower rolls a heavy endless felt 40 passes which takes up in absorbtion the liquor on the fiber and forces the oleaginous matter into the fiber. The endless felt passes into a washing trough 41 thence through press rolls 42 and over steam heated cylinders 43 to dry the felt and enable a continuous process to be carried on.

The fiber from the press rolls 39 falls on to a slat type conveyor 44 from which it is raked into the feed hopper 45 of the dryer 46. In this enclosure where an ozonating and drying process is operated, the fiber is carried along by a series of horizontal wires longitudinally arranged side by side in tiers and supported and moved by grooved pulleys. The design being such that the fiber is carried along by the wires 47 and is turned over as it drops to the succeeding wire surfaces. During the passage of the fiber through the enclosure 46 a stream of ozonated and heated air is passed through the moving mass of fiber, the humidified air passing from the apparatus by the pipe 48. In this connection the air dehydrator 49 supplies the ozonator 50, and on the other side the air heater is indicated at 51 and the delivery fan at 52 with the usual pipes and valves in connection.

The finished fiber is delivered from the drier 46 on to the slat conveyor 53.

Having now declared the nature of this my said invention, what I claim and desire to be secured by Letters Patent, is:

In an apparatus for the production of fiber from flax and hemp straw and from the leaves of Phormium-tenax sisal abacca-Yucca and the like the combination comprising, an elevator having elongated buckets, a tipping tank of triangular cross section oscillating on trunnion bearings and having a normally horizontal sliding cover with perforations disposed longitudinally near one edge for draining the said tank when tipped, an enclosed tank substantially smaller than the said tipping tank and supported therefrom and positioned above the said cover and alongside the unperforated edge thereof, the said enclosed tank containing a steam coil and water intake and delivery pipe connections, a perforated water pipe in the angular bottom of said triangular pipe connected to a vertical outlet pipe, a rotary pump, the said pump being connected by flexible pipes to the said outlet pipe and the said delivery pipe connection, the said tipping tank being adapted to receive the discharge from the said elevator, a perforated slat conveyor adapted to receive the contents of the said tipping tank, a shaking screen in combination with a water spray device, pressure rolls adapted to receive the discharge from the said shaking screen, a water flume in connection with the delivery side of the said rolls, a series of paddles transversely disposed within the said flume and worked by external gearing, a series of perforated air pipes below and between the said paddles, a perforated shaking screen in combination with a water spray and adapted to receive the overflow from the said flume, a slat type conveyor receiving the discharge from the last said shaking screen, a tipping tank similar to the first said tipping tank and adapted to receive the discharge from the last said conveyor, a perforated slat conveyor arranged to receive the contents of the last said tank, a bucket conveyor adapted to elevate the discharge from the last said slat conveyor to a third tipping tank, a tipping tank similar to the first said tipping tank and adapted to receive the discharge from the last said elevator, a slat conveyor adapted to receive the contents of the last said tank, an absorption roll device positioned to receive from a shaking screen within the said device the discharge from the last said slat conveyor, the said absorption device consisting of an endless felt passing between the said rolls and thence through a washing trough through press rolls and over steam heated cylinders and so forming a continuous process involving absorption compressing washing and drying, a slat type conveyor adapted to receive the compressed fiber from the last said rolls, a drier designed to receive the discharge from the last said conveyor, the said drier being an enclosure housing a series of tiers of horizontal and longitudinally disposed wires carried by pulleys and adapted to traverse the fiber delivered thereto which is turned over as it drops to successive tiers, a platform arranged to receive the contents of the said drier and a final slat conveyor adapted to dispose of the finished material from the said apparatus, the said drier being adapted to receive a stream of heated air in combination with a stream of de-hydrated ozonated air and means for supplying the said heated and ozonated air, all substantially as described and shown.

J. G. W. STANLEY.